US012646533B2

(12) United States Patent (10) Patent No.: US 12,646,533 B2

Couthier (45) Date of Patent: Jun. 2, 2026

(54) SYSTEM AND METHOD FOR DYNAMIC MIXING OF AUDIO

(71) Applicant: Sony Interactive Entertainment Inc., Tokyo (JP)

(72) Inventor: Loïc Couthier, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/785,547

(22) Filed: Jul. 26, 2024

(65) Prior Publication Data

US 2025/0061921 A1 Feb. 20, 2025

(30) Foreign Application Priority Data

Aug. 17, 2023 (GB) ...................................... 2312574

(51) Int. Cl.
G11B 27/031 (2006.01)

(52) U.S. Cl.
CPC .................................. G11B 27/031 (2013.01)

(58) Field of Classification Search
CPC .................................................. G11B 27/031
See application file for complete search history.

(56) References Cited

U.S. PATENT DOCUMENTS 9,008,786 B2 * 4/2015 Neal .................. A61N 1/36038
607/55
10,966,033 B2 3/2021 Clark
2015/0332680 A1 11/2015 Crockett

FOREIGN PATENT DOCUMENTS

WO WO-2012139668 A1 * 10/2012 ........... G10L 19/038

OTHER PUBLICATIONS

Combined Search and Examination Report for corresponding GB Application No. GB2312574.3, 5 pages, dated Feb. 20, 2024.
Reiss "Intelligent Systems for missing multichannel audio" IEEE 17th International Conference on Digital Signal Processing, Centre for Digital Music, 6 pages, Aug. 1, 2011.
Application No. EP24192275.6, Extended European Search Report, Mailed On Dec. 12, 2024, 7 pages.
Hafezi et al., "Autonomous Multitrack Equalization Based on Masking Reduction", Journal of the Audio Engineering Society, vol. 63, No. 5, May 2015, pp. 312-323.
Tom et al., "An Automatic Mixing System for Multitrack Spatialization for Stereo Based on Unmasking and Best Panning Practices", Available online at: https://www.eecs.qmul.ac.uk/~josh/documents/2019/20311.pdf, Mar. 2019, pp. 1-10.

* cited by examiner

*Primary Examiner* — Mishawn N. Hunter
(74) *Attorney, Agent, or Firm* — Kilpatrick Townsend & Stockton LLP

(57) ABSTRACT

A system for dynamically mixing audio content, the system comprising: a receiving unit configured to receive input audio; an analysis unit configured to analyse the input audio to determine one or more masking patterns; an attenuation unit configured to attenuate one or more channels of the input audio in accordance with the one or more masking patterns, and an output unit configured to output attenuated audio.

20 Claims, 4 Drawing Sheets

SYSTEM AND METHOD FOR DYNAMIC MIXING OF AUDIO

BACKGROUND OF THE INVENTION

Field of the Invention

The following disclosure relates to systems and methods for dynamically mixing audio content, and in particular to such systems in the context of video game audio.

Description of the Prior Art

Audio content in recent years increasingly combines many different sounds and tracks, normally arranged in channels to be mixed for output. Audio characteristics such as tone, level, timbre of each channel can be adjusted during such a mixing process to produce a specific type of audio output.

Interactive content such as video games typically comprises audio of various different types, such as background music, dialogue, foley, stings, impact and other sound effects. In recent years, the increase in production value of video games has allowed the orchestration of a vast number of different sounds in order to create an immersive, realistic, and enjoyable experience for the user. However, audio characteristics for each component must be carefully tuned to provide clarity to the user. For example, dialogue is normally considered a high priority sound as important information is conveyed in speech, and it can be obscured if the background music is at too high a level. However, stopping the music entirely when dialogue is present can be jarring and can cause the player to become less immersed in the game world. Given these challenges, and particularly given that the situation within the game can suddenly change (sometimes at the whim of the player), intricate mixing for such large quantities of sounds can be difficult and laborious.

Whilst dynamic mixing systems exist in the art to allow for example automatic ducking of amplitude of the music channel, the ducking over time is often highly noticeable and distracting, especially over longer times of >200 ms. Other solutions exist for processing audio but require too much processing expense to allow real-time mixing of audio content.

It is therefore desirable to provide systems and methods for dynamically mixing audio of different types which is computationally light and which produces believable results.

SUMMARY OF THE INVENTION

According to an aspect of the disclosure, there is provided a system for dynamically mixing audio content, the system comprising: a receiving unit configured to receive input audio; an analysis unit configured to analyse the input audio to determine one or more masking patterns; an attenuation unit configured to attenuate one or more channels of the input audio in accordance with the one or more masking patterns, and an output unit configured to output attenuated audio.

The system is based on auditory perception, and in particular on psychoacoustic frequency masking patterns of simultaneous signals. Psychoacoustic masking happens when one audio signal of given frequency is played together with another audio signal with similar frequency. The extent and characteristics of masking caused by a particular signal are described by the masking pattern. Audio comprising multiple audio components (described herein as being in separate channels) can therefore often display masking of various audio components over other audio components across different frequency bands. By incorporating the masking effects into a dynamic mixing system it is possible to utilise the effects of the masking phenomenon to provide a clean mix at a low computational cost. In particular, it is possible to attenuate a lower priority audio component at one or more spectral regions where it is masked by one or more higher priority audio components, which delivers a more targeted approach to attenuation of low-priority components. For example, when dialogue is present, the masking pattern of signals in the dialogue channel can be used to calculate a pattern for attenuating the music signal, so that the music can be effectively masked by higher priority dialogue. The masking patterns may be determined through fast Fourier analysis and the like.

Whilst prior art systems are restricted to attenuating amplitudes across entire spectra, such a perceptually driven, spectrally focused, dynamic mixing system can bring clarity to higher priority content whilst attenuating lower priority content in a natural sounding manner.

Audio received by the system may comprise multiple components organised across multiple channels. The receiving unit may be configured to receive input audio comprising at least a first channel and a second channel. The analysis unit may be configured to determine one or more masking patterns of the first channel, and the attenuation unit may be configured to attenuate at least part of the second channel based on the one or more masking patterns of the first channel.

In spectral regions where the level of the second channel exceeds the masking pattern of the first channel, the second channel may be attenuated. In spectral regions where the level of the second channel is below the masking pattern of the first channel, the content of the second channel may be removed entirely. As an illustrative example, if the contents of the second channel between 1.3 kHz and 1.8 kHz are completely masked by the first channel, then the content of the second channel in that range may be removed as it is effectively inaudible to the user anyway.

The analysis unit may be configured to determine one or more critical bands masked by the first channel, and the attenuation unit may be configured to attenuate the second channel across the one or more critical bands. To provide an accurate representation of the spectral regions across which complete masking occurs, critical bands of at least one of the channels may be used to mark the spectral regions across which attenuation is to be applied. The critical bands may be determined from a set of BARK and/or mel scaled filters.

In some situations, a user of the system may wish to manually control the spectral regions in which one or more channels are attenuated. A user may also wish to specify the extent of attenuation. The receiving unit may be further configured to receive user input. The attenuation unit may be configured to attenuate one or more channels of the input audio in accordance with the user input. The user may for example specify a particular frequency range in which attenuation is to be increased or reduced. For example, the user may specify that the attenuation occurs only between around 100 Hz and around 8 kHz. The user may also specify the amount of attenuation across spectral regions. In some situations, the user may wish to leave some spectral regions of a particular channel unaffected. The receiving unit may be configured to determine, from the user input, a protected band. The attenuation unit may then be configured to leave the protected band unattenuated on one or more channels.

In some situations, predefined configurations may also be provided for selection by the user; these may correspond, for example, with typical age-related progressive hearing loss profiles. Configurations for such profiles would account for a tendency to lose sensitivity in higher frequency ranges with age; hence for example attenuation for masked channels may be increased at higher frequencies (e.g. in one age profile above 8 kHz, and in another 'older' age profile, above 4 kHz), to further improve the intelligibility or clarity of higher profile channels in these frequency regions. Optionally a user's own hearing profile, if available in a known format, could be imported for this purpose.

Similarly also left- and right-mixes may be selected separately, either manually or as predefined/imported configurations.

Hence more generally the receiving unit may be further configured to receive a mixing modifier, which may be one or more of a user input and/or a predefined configuration. The attenuation unit may be configured to attenuate one or more channels of the input audio in accordance with the mixing modifier.

In some situations it may be desirable to boost the level of some channels at least in part. The analysis unit may be configured to determine one or more boost bands across which a level boost is desired. The attenuation unit may be configured to boost the amplitude of one or more channels over the spectral region of the one or more boost bands. Such boost bands may be manually specified by the user as part of the user input described herein. In some examples, a relative boost may be applied by reducing the overall level of the entire spectrum outside of the boost bands.

Again, such boost bands may optionally be defined as or as part of predefined configurations, which again may for example correspond with typical age-related progressive hearing loss profiles, or imported user profiles.

Where audio comprises multiple competing components, it is normally desired that the highest priority audio component is perceptible (i.e. heard by the user) over lower priority audio components. In the context of this invention, it may therefore be desirable that the highest priority audio component is allowed to mask lower priority audio components. The analysis unit may be configured to determine priority levels of one or more channels in the input audio. This may be done by simply receiving user input which specifies the priority levels (the receiving unit may be configured for this), or the analysis unit may perform some contextual analysis to determine the most likely priority levels for each channel. In the case of user input, the user may specify priority levels for each channel at each point in time, for example. In the case of contextual analysis, in one example the analysis unit may be configured to compare dynamic range of each channel. The priority level may represent the difference in dynamic range between the high and low priority sounds. With the aim to allow the highest priority channel to mask the others, the analysis unit may be configured to determine one or more masking patterns of the highest priority channel. In order to improve clarity of the highest priority channel, the attenuation unit may be configured to attenuate the lowest priority channel (and/or lower priority channels).

The prioritisation of audio components may vary with time and/or situation. Considering a video game environment for example, in a fight scene, the background music and impact sounds may take priority over foley and dialogue, but in a cinematic scene the dialogue and foley may take priority over background music. Hence in an embodiment of the description, it is desired for the system to be able to take account of dynamically changing prioritisation (and therefore to dynamically adjust which channels are to be attenuated and the masking pattern under which the attenuation is applied). As noted herein, the system may be used for dynamically mixing audio for video games, and therefore the system may be connected to a video game system. The receiving unit may be configured to receive video game data from such a video game system. Video game data may comprise information about the video game, such as game state data, game environment data and the like. The analysis unit may be configured to determine priority levels based on the received video game data. By having the ability to receive video game data and to automatically determine the priority levels from the video game data, the system allows for a seamless dynamic mixing of interactive content.

It will be appreciated that, in the same manner as described herein with respect to user input data, the analysis unit may also take the received video game data to determine the extent and spectral bands in which attenuation is applied.

As noted herein, advantages of the present system are particularly evident when used in video game applications. It may in some cases be desirable to provide dynamic mixing of audio content on-the-fly. That is to say it may be desirable to provide real-time mixing of audio, either in final product or in production pipeline. The receiving unit may be configured to receive an audio stream from a currently running video game. The output unit may be configured to output processed audio in real-time back to the video game.

An 'audio component' is intended to mean a part of the overall audio output. For example, if the media content is a scene of a character in a forest, the audio output may comprise background ambience (e.g., sounds of the wind, trees, birds), background music, foreground effects (e.g., character footsteps, item use, weapon sounds), and dialogue. Each of the different sounds may be said to constitute a component of the output audio, and may or may not be comprised in its own audio channel, or track.

The input audio may be associated with any type of media content. For example, the media content may include music, audiobooks, movies, interactive content such as slideshows, and most pertinently, video games. For the purposes of convenience and ease of reference, many aspects of the present disclosure will be described with reference to interactive content such as video games. However, it will be appreciated that the underlying principles of the invention can be applied to any media content.

As noted above, the one or more audio components may be contained in one or more separate audio channels. That is to say that each and every audio component may be in its own separate channel, or some may share channels and others in separate channels.

The system may also take into account information about the current state of the media content. The input unit may be further configured to obtain media data representative of the state of the media content. For the media content being a video game, the media data may comprise information about the game state and/or environment. Examples of such information include game title, platform, level, player state, events (past, current, and/or upcoming), weather, time of day, screen brightness levels, danger state, health points of players or characters, and the like.

The analysis unit may comprise, or have access to, a machine learning model trained to separate and/or classify all the audio components in the input audio. A specialised machine learning model may be trained for each media content—for example one for each video game title, series, or genre.

In some examples, a machine learning neural network may be accessed by the analysis unit to classify audio components. The neural network may be trained on labelled sets of audio clips. For example, sets of audio clips relating to different uses (e.g., background music, foley, impact, weapon use, etc) may be labelled as such and fed to the neural network for training such that the network is able to receive an unlabelled audio clip and classify it to one of the trained labels.

In some situations, it may be desired to isolate certain parts of one or more input audio components. In such a case, source separation may be utilised to separate out sub-components. One or more of the input unit and the analysis unit may be configured to perform sound source separation on one or more of the audio components to generate sub-components. The analysis unit my then be configured to determine a most prominent component from all available components and sub-components.

According to another aspect of the disclosure, there is provided a method for dynamically mixing audio content, the method comprising the steps of: receiving input audio; analysing the input audio to determine one or more masking patterns; attenuating one or more channels of the input audio in accordance with the one or more masking patterns, and outputting the attenuated audio.

The method may comprise a step of performing sound source separation on one or more of the audio components to generate sub-components. In such a case, the step of determining a most prominent audio component may be done from all available audio components—that is, both the input audio components and the sub-components. In other words, the most prominent audio component may be determined from any identified input audio component and/or sub-component.

In some examples, the step of determining a most prominent audio component comprises assigning each of the one or more audio components a prominence value, and wherein the step of generating an output haptics signal is done based on a combination of audio components weighted by their prominence value.

It will be appreciated that any one or more of the features described above with respect to the first aspect of the disclosure may be adapted and applied to the second aspect. For example, the methods of the second aspect may be adapted to include steps to provide any one of the functionalities described above with respect to the systems of the first aspect, associated with similar technical advantages.

According to a third aspect, the present disclosure provides a computer program comprising instructions which, when executed by a computer of an audio-visual entertainment system, cause the computer to control the audio-visual entertainment system to perform a method according to the second aspect.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF EXAMPLES

An aspect of the present disclosure is a system for dynamically mixing audio content. The audio content may be associated with a video game, operating on a gaming console for example.

Figure 1:
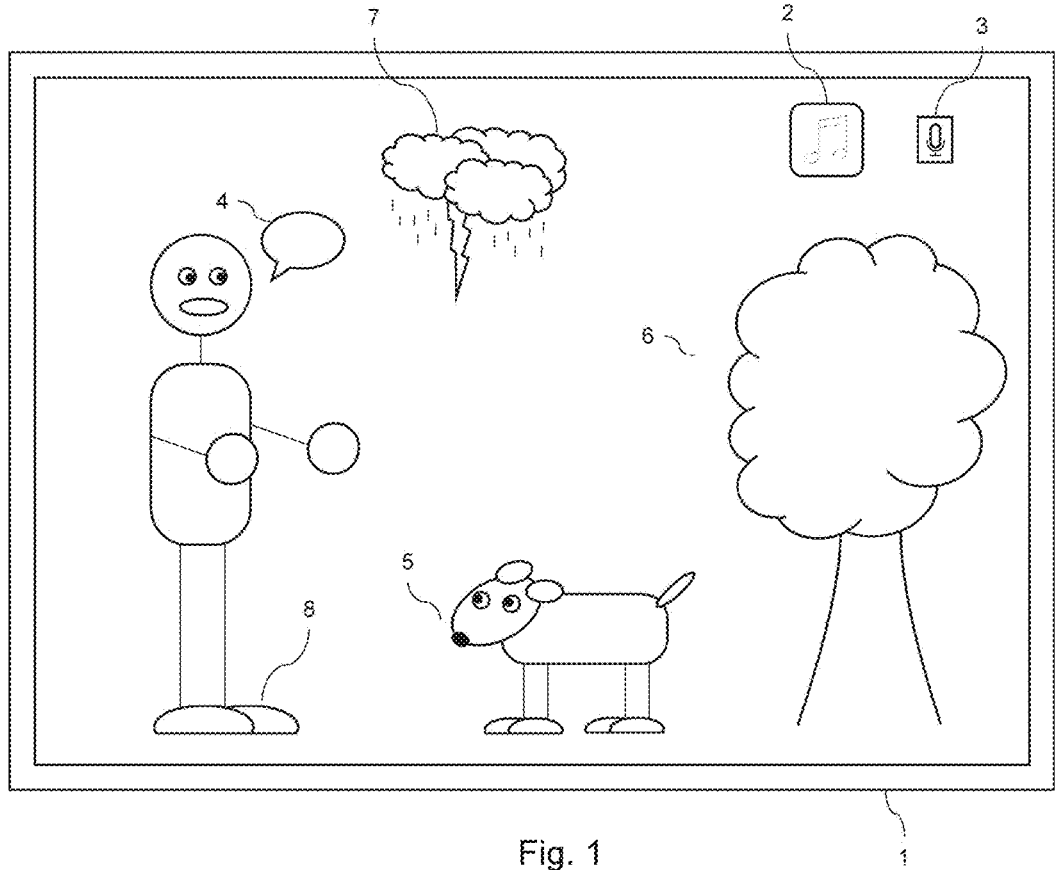
FIG. 1 is a schematic illustration of an audio-visual entertainment system in association with which a method according to the invention may be implemented.

Referring now to the drawings, wherein like reference numerals designate identical or corresponding parts throughout the several views, an exemplary environment within such an audio-visual entertainment system is illustrated in FIG. 1.

The example multi-media environment 1 comprises a variety of audio sources, each producing sounds, or audio components, to be played back through an audio output and transmitted to the user. The environment could be, for example, a scene in a motion picture such as a movie or a TV show, or a video game environment.

In this example, the scene is in a video game and comprises a speaking character outputting dialogue 4, an animal producing animal audio 5, weather and foliage constituting atmospheric audio 6, foley 8 from character movement, and a weather event—e.g., lightning-generating audible thunder effects ('event' audio 7). Furthermore, background music 2 is playing, and a voice chat 3 associated with the game environment 1 also activated. Background music 2 is also associated with this game environment. The music 2 may be part of the game, or through an overlay, and may be pre-mixed.

The background music 2 in this example is associated with the game environment, and typically comprises one or more instrumental elements (e.g., strings, percussion, brass) and one or more voice elements. The music 2 can be pre-recorded music and can be stored and/or loaded as part of the game environment. Alternatively, or in combination, the music 2 can be music stored in other locations (for example in the user's personal data storage separate from the location of the game storage, or in a database accessible via a network). The music 2 can also be generated and/or mixed from constituent components in real-time, or procedurally generated by use of a neural network, for example. Each element of the background music 2 may be on a separate track or channel, or loaded within the game environment as a single pre-mixed track.

The character dialogue 4 comprises speech. The speech is generally derived from pre-recorded audio, for example from a voice over artist, and can be arranged to play back together with animation of the character model. In some examples the speech is procedurally generated, for example through a machine learning model utilising a neural network-which may generate the speech according to some input factors such as an event occurring or the user's actions in the game world.

Whilst in the example scene of FIG. 1 the character is visible within the frame, in other examples the character dialogue 4 may equally be a narration, with the originating character (or voice over actor) not appearing in the scene. The in-game environment 1 can comprise multiple such characters outputting various different audible dialogues 4 as described above. The importance, or priority level, of each dialogue component may vary at different points or situations in the game. Similarly, the language of dialogue may affect the priority of a dialogue component.

It can be observed that the video game scene comprises many different audio sources which are capable of contributing to the overall output audio. Whilst in some situations the output audio may comprise only one, or even none, of the components illustrated in FIG. 1, at most points in time the master audio will comprise a collection of various different components. Such an orchestral combination of sounds requires careful tuning of characteristics of each component—typically achieved through a process of EQ balancing. In order to avoid overloading the user with confusing sounds (e.g., the background music 2 and foley 8 being too loud and completely obscuring dialogue 4 and/or important event sounds 7), game designers must carefully tweak the balance of audio levels for examples to allow clarity on the key audio. This can be laborious and inefficient. One aim of the present invention is to allow the dynamic mixing of such audio without strenuous input from the game designers.

Figure 2:
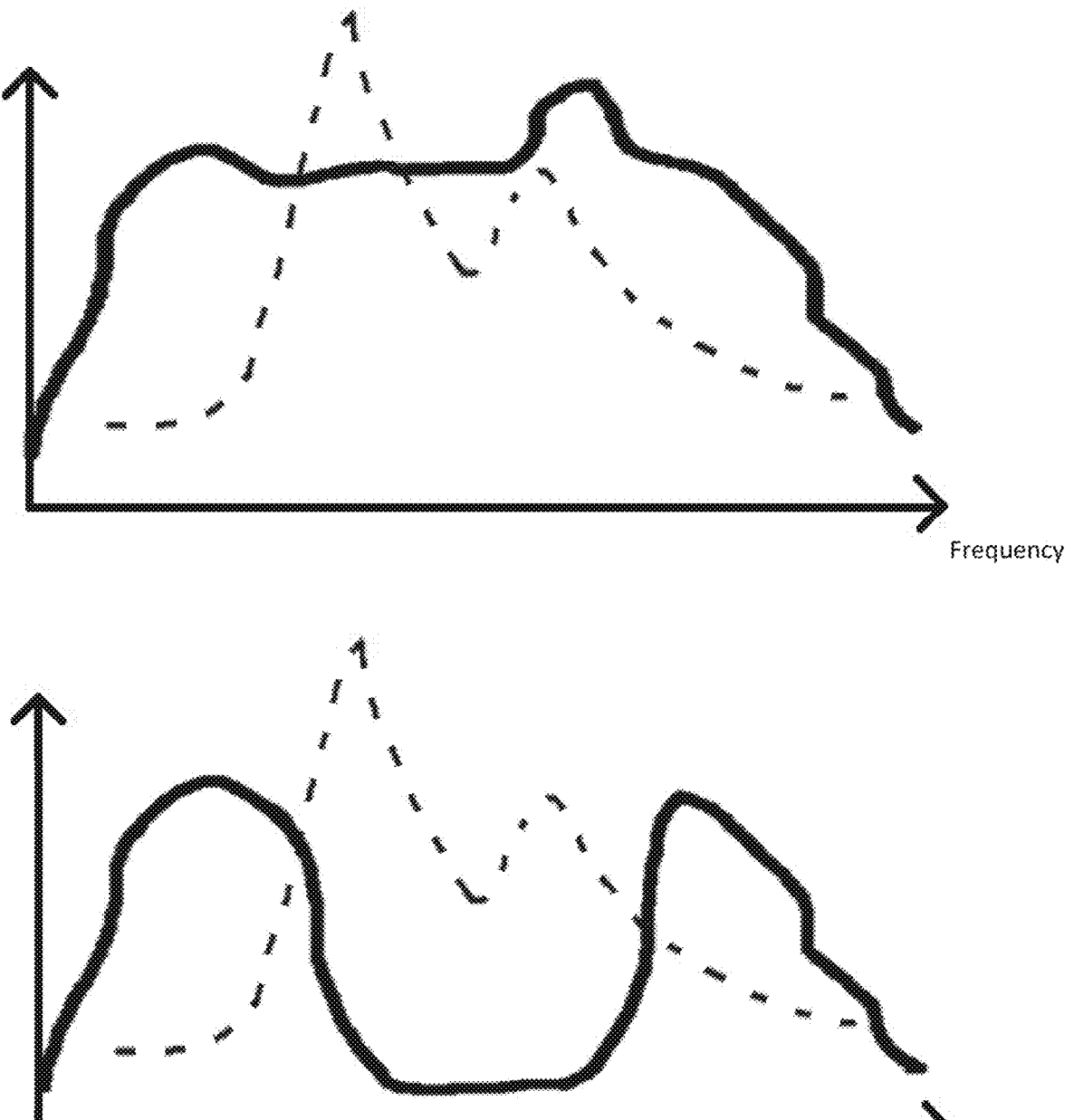
FIG. 2 is a schematic illustration of a masking pattern.

For the sake of simplicity, we consider a scene in which the master audio output comprises background music 2 and dialogue 4. FIG. 2A illustrates an example set of exaggerated, not-to-scale frequency spectra at a given point in time, with the solid line representing the background music 2 and the dotted line representing dialogue 4.

Music and dialogue being played at the same time constitute simultaneous signals, which can cause auditory masking. It can be seen particularly around the centre region of the spectra that there are overlapping signals, causing the dialogue to be muddied and difficult to perceive by the user. Additionally, there will be parts of the music signal that are difficult to hear over parts of the dialogue.

It is an aim of this invention to provide a system for dynamic mixing of such signals, so that a desired type of audio is better perceptible over other types of audio. In particular, to allow higher priority sounds to be more perceptible over lower priority sounds. The system is based on auditory perception, especially psychoacoustic frequency masking patterns of simultaneous signals. It artificially applies frequency-masking EQ attenuation to low priority sounds in order to make more spectral space for the higher priority sounds, to increase their audibility. In this example, the dialogue may be deemed to be of a higher priority than the music audio. By determining the masking pattern of the higher priority sound, and attenuating the lower priority sound to bring them below the masked threshold, it is possible to efficiently mix the two sounds to allow the higher priority sound to be more perceptible. The attenuation (or suppression) of the lower priority sound can be applied on critical bands that are masked by the higher priority content. It can be seen in FIG. 2B that with the music channel substantially attenuated in the central region (where the dialogue has most masking effect), the dialogue is well clear of the music and is easily perceptible by the user.

Whilst it may seem counterintuitive to attenuate at least some lower-priority audio in areas that may be psychoacoustically masked anyway, advantageously by attenuating audio components within frequency bands where they might normally be masked by higher priority audio components, the overall sound provided to the user is made clearer in a more naturalistic and transparent manner by reducing the overall energy in the sound within these frequency bands; in effect this creates an improved signal to noise ratio specifically for high priority parts of the sound that the user might unknowingly expect to have good quality, due to exposure to perceptual masking in normal life. Where these high priority parts are also important for the intelligibility of the content, optionally further due to hearing loss, the technique also assists the user in assimilating the information the parts convey. Finally, by determining what is high priority, optionally on a dynamic basis depending on the context of the content, the effective masking of two competing audio components can be controlled to favour whichever one is currently more important to the content.

Figure 3:
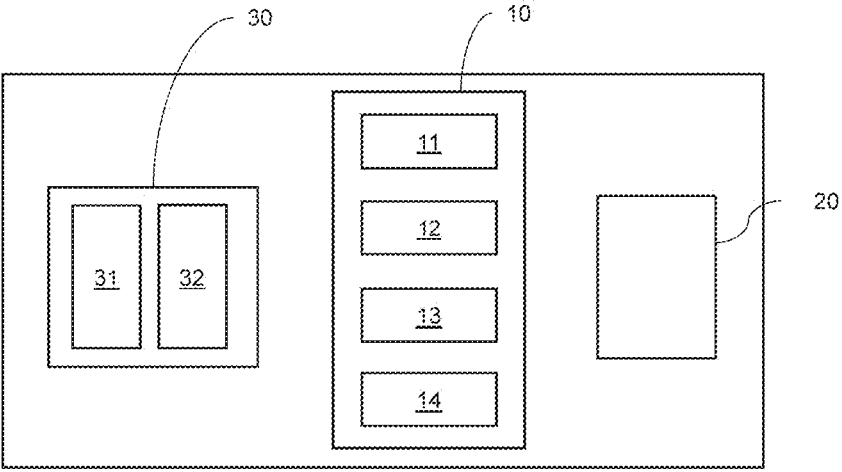
FIG. 3 is a schematic illustration of an example system in an assembled configuration.

FIG. 3 is a schematic block diagram of an example system 10 configured to take in audio from the video game scene 1 and dynamically mix its contents for output to the user or player of the game. The features of FIG. 3 may be located in a video game system such as a console or computer, or alternatively may be a separate physical module.

The example system 10 is configured for dynamically mixing audio content associated with a video game environment, and comprises a receiving unit 11, an analysis unit 12, an attenuation unit 13, and an output unit 14.

The receiving unit 11 is configured to receive input audio. In the example of a video game application, the receiving unit 11 is configured to receive input game audio and obtain the available audio components for use by the rest of the system. The game audio typically consists of some or all of the audio described above with reference to FIG. 1, although some components may be inaccessible or disregarded. For the purposes of this example, each of the music 2, voice chat 3, dialogue 4, animal sounds 5, atmospheric sounds 6, events 7, and foley 8 are considered to be separate audio components, with each component present on a separate channel. In some examples, the receiving unit 11 can also be configured to obtain game data representative of the status of in-game objects and environments.

The analysis unit 12 is configured to receive the audio channels obtained by the input unit 11, and to analyse the input audio to determine one or more masking patterns. Masking patterns in this context indicates some data or function representing the amount of masking caused by an audio signal from one or more of the obtained audio channels. One exemplary form of a masking pattern is a graph, or masking audiogram, which shows the amount of masking produced at each frequency. The analysis unit 12 may be configured to select one of the channels, for example based on a priority value of the channel, and to determine a masking pattern of the signal from that channel. That is, the masking effect caused by that selected channel on the perception of the other channel(s).

In some examples, the analysis unit 12 may determine an audio channel with the highest priority from all the available channels. The highest priority can be thought of as the audio most relevant for the user to be able to perceive at that moment in time, from the combination of all the different audio components. Priority is used in this context as the measure of how important it is that a particular audio component is communicated to the user, at that particular moment in the gameplay. It will often depend on the situation in the game—for example, when the main activity the in-game player is undergoing is traversal, footsteps may be the most relevant detail to be heard by the user. When the player is battling another, the sound of melee weapons or bullets hitting the player may be the most relevant aural detail that can be communicated to the user. The analysis unit 12 is configured to determine/classify which of the currently active audio components is most relevant and therefore highest priority. For this, the analysis unit 12 may not only factor in the audio components but also game data, representative of the current events and status of the game environment. Such game data may be obtained by the receiving unit 11.

In some examples, the analysis unit 12 may comprise, or have access to, a machine learning model trained to analyse audio components. The machine learning model may be trained on a library of labelled and pre-determined audio components. The pre-determined audio components may be labelled and ranked for example by relevance to gameplay and may also be pre-labelled with priority levels. The audio components may also be labelled by relevance to game data—for example labelled by relevance to certain in-game events (e.g., battle, traversal, dialogue).

Alternatively or in addition to the machine learning model, audio components (e.g. sound files or live sources) may be tagged with metadata directly indicating priority. For example, dialog may be tagged as high priority. However, as noted above, it is optionally beneficial for the priority to change according to the context of the content. Therefore in an embodiment of the description, audio components may be tagged with metadata indirectly indicating priority; for example audio components may be tagged with one of the plurality of classes mentioned with reference to FIG. 1 (e.g. dialogue, other NPC audio, atmospheric, foley, event, music, and chat), and different priority schedules may be associated with different content contexts (e.g. game states, locations, quests or the like). Hence for example a priority schedule may prioritise dialogue when a game switches to a dialogue view of non-player characters, and prioritise foley sounds when on a quest associated with stealth. A default priority schedule (for example prioritising dialogue) may be used when no specific schedule is relevant. Depending on how the audio components are organised, optionally the file path to the components may be tagged or comprise the tag rather than the individual components; for example using folders such as assets/audio/dialogue or assets/audio/music. It will be appreciated that the eight examples herein are non-limiting, and tags may indicate more or fewer classes, for example as few as dialogue or other, and as many as per individual audio component.

In some examples, a machine learning model may be trained using such tags for current audio components and contextual information relating to the content as inputs, and appropriate priority schedules as targets, to learn to prioritise audio components as they are encountered within the content, potentially in new combinations of contexts.

In one example, the analysis unit 12 is configured to select one or more channels of the input audio from which one or more masking patterns are to be derived. These may optionally be selected in order of priority on the assumption that higher priority audio will mask lower priority audio. Considering the case where a single channel is selected, the analysis unit 12 may process the audio signal from that channel at one or more points in time and determine one or more masking patterns. That is, the analysis unit 12 may determine the masking effect of the signal across a spectrum of frequency values. In doing so, the analysis unit 12 may generate a new masking pattern at each time. The analysis unit 12 may also comprise, or have access to, a memory containing a library of pre-determined masking patterns, and the analysis unit 12 may be configured to select a masking pattern of best fit in dependence on the signal at hand. The analysis unit 12 can then either select the one or more matched library masking pattern to be the masking pattern to be passed to the attenuation unit, or it may edit or make changes to the matched masking pattern(s). For example, if multiple matched masking patterns are selected, the analysis unit 12 may mix a combination of the multiple masking patterns. Hence more generally determining one or more masking patterns may comprise obtaining one or more masking patterns, for example from such a library, or from previous analyses of the audio components (which masking patterns in turn may create or be added to the library).

The attenuation unit 13 is configured to attenuate one or more channels of the input audio in accordance with the one or more masking patterns. Continuing the example described above, the attenuation unit 13 may be configured to select the channel(s) other than the channel selected by the analysis unit 12 (for which the masking pattern was determined) and to attenuate the signal on that channel(s). More particularly, the attenuation unit 13 may be configured to attenuate the signal such that it falls within the masking thresholds of the one or more determined masking patterns, such that the masked areas are removed from the lower priority channels.

As noted previously, parts of the audio in the lower priority channel(s) may be attenuated in response to the masking pattern, or may be removed entirely. Optionally these parts may be removed if the attenuated result drops below a threshold level; optionally a cumulatively attenuated result, if several higher priority channels are each analysed to provide masking.

In addition, where parts of the audio in the lower priority channel(s) are removed according to any scheme, optionally hysteresis may be applied so that the audio does not switch in and out between successive analyses; typically if performing frequency analysis, this is done in successive and optionally overlapping windows, and so there may be separate decisions for example every 100 or 200 ms; optionally if parts of the audio in the lower priority channel(s) are removed entirely, they can only be reinstated after a longer predetermined period (e.g. 1 second), or once the audio component is used again (e.g. in the case of foley or ambient effects).

The output unit 14 is configured to output the attenuated audio. It may output the audio back to a system from which the receiving unit 11 obtained the input audio—for example the video game system 20—or it may directly output the audio for real-time or delayed playback through for example speakers 31, 32 on sound system 30. The output unit 14 may be configured to output a multichannel output with different components.

Where sound systems 30 having multiple outputs are available—such as a left speaker 31 and right speaker 32—the result of attenuation by the attenuation unit 13 may be non-symmetric and the output unit 14 may be configured to preserve the non-symmetry in its multichannel output.

In use, the gaming system 20 generates a game environment 1 having multiple sources of audio such as background music 2, dialogue 4 and foley 8. The master audio from the gaming system 20 is obtained by the receiving unit 11 and the analysis unit 12 determines one or more suitable masking patterns. The attenuation unit 13 then takes the one or more masking patterns and attenuates the signals in the other audio channel(s) such that their levels come below the masking threshold of the determined one or more masking patterns. The output unit then outputs an audio signal including the attenuated channels to be played at the connected speaker system 30 to accompany the game from the game system 20.

Figure 4:
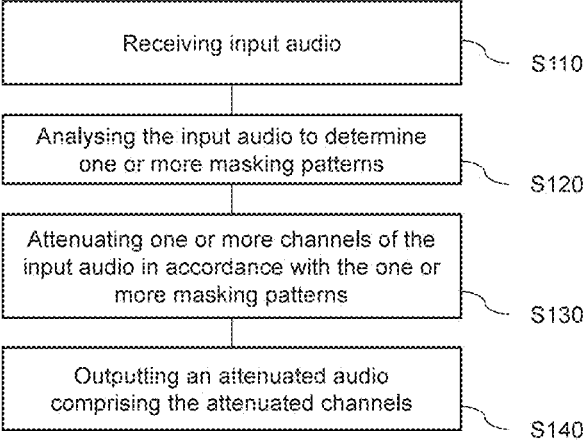
FIG. 4 is a schematic illustration of an example method for dynamically mixing audio content.

FIG. 4 is a flow chart schematically illustrating steps of an example method as disclosed herein.

At step S110, input audio is received. The input audio may comprise one or more audio components of a media content. In some examples, the media content is a video game being played by a user. This step can be performed by a receiving unit of the type described herein for example with reference to FIG. 3. In other words, the step S110 can be implemented by configuring or controlling a receiving unit 11 to obtain one or more audio channels of the input audio. In some examples, the step can comprise a sub-step of obtaining media data indicative of a current state of the media content. When the media content is a video game, the media data can be game data, indicative of current game state including information relating to graphics and audio output of the game.

At step S120, one or more masking patterns are determined by analysing the input audio received in step S110. When analysing the input audio, the current signal in the input audio may be analysed—that is to say that the step may be performed in real-time as the media content is being delivered. This step can be performed by a analysis unit 12 of the type described herein for example with reference to FIG. 3. In other words, the step S120 can be implemented by configuring or controlling a analysis unit 12 to determine one or more masking patterns. The step can also comprise a sub-step of determining a first channel and a second channel from the input audio, and determining at least one of the first and second channels from which to derive a masking pattern.

At step S130, one or more channels of the input audio is attenuated in accordance with the one or more masking patterns determined in step S120. This step can be performed by an attenuation unit of the type described herein for example with reference to FIG. 3. In other words, the step S130 can be implemented by configuring or controlling an attenuation unit 13 to attenuate one or more channels of the input audio in accordance with the one or more masking patterns.

At step S140, an attenuated audio comprising the one or more attenuated channels is output. This step can be performed by an output unit of the type described herein for example with reference to FIG. 3. In other words, the step S140 can be implemented by configuring or controlling an output unit 14 to output an attenuated audio comprising the attenuated channels.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system for dynamically mixing audio content, the system comprising:
    one or more processors;
    one or more computer-readable media having stored thereon instructions that when executed with the one or more processors cause the system to, at least:
        receive input audio;
        analyze, with the one or more processors, the input audio to determine one or more masking patterns, wherein the input audio comprises a plurality of audio channels and individual masking patterns quantify an extent to which an audio channel of the plurality of audio channels causes psychoacoustic masking with respect to one or more other audio channels of the plurality of audio channels;
        attenuate one or more lower priority audio channels of the input audio in accordance with the one or more masking patterns such that, after attenuation, individual masking patterns corresponding to individual lower priority audio channels indicate reduced psychoacoustic masking with respect to one or more higher priority audio channels; and
        output attenuated audio.

2. A system according to claim 1, wherein:
    the input audio comprises at least a first audio channel and a second audio channel;
    the analyzing of the input audio comprises determining one or more masking patterns of the first audio channel with respect to the second audio channel, and
    the attenuating of the one or more lower priority audio channels comprises attenuating at least part of the second channel based on the one or more masking patterns of the first channel.

3. A system according to claim 2, wherein the system is further caused to determine one or more critical frequency bands masked by the first audio channel, and attenuate the second audio channel across the one or more critical frequency bands.

4. A system according to claim 3, wherein the critical frequency bands are determined based on a set of BARK filters and/or a set of mel scaled filters.

5. A system according to claim 1, wherein the system is further caused to identify spectral regions in which the one or more masking patterns substantially completely mask an audio channel of the input audio, and remove the audio from that audio channel in the identified spectral region.

6. A system according to claim 1, wherein the system is further caused to:
    receive a mixing modifier comprising one or more selected from the list consisting of:
        i. a user input; and
        ii. a predefined configuration; and
    attenuate the one or more audio channels of the input audio in accordance with the mixing modifier.

7. A system according to claim 6, wherein the system is further caused to determine a protected frequency band based on the mixing modifier, and leave the protected band unattenuated on one or more of the plurality of audio channels.

8. A system according to claim 1, wherein the system is further caused to determine one or more boost bands, and boost amplitude of one or more audio channels over the one or more boost bands.

9. A system according to claim 1, wherein the system is further caused to determine priority levels of one or more of the plurality of audio channels in the input audio; and determine one or more masking patterns of a highest priority channel.

10. A system according to claim 9, wherein the system is further caused to attenuate a lowest priority channel.

11. A system according to claim 10, wherein the system is further caused to receive video game data, and derive the priority levels from the received video game data.

12. A system according to claim 1, wherein the system is further caused to receive an audio stream from a currently running video game, and the output processed audio in real-time to the video game.

13. A system in accordance with claim 1, further comprising determining a priority for individual ones of the plurality of audio channels.

14. A system in accordance with claim 13, wherein the priority of an audio channel is determined based on metadata accompanying the input audio.

15. A system in accordance with claim 13, wherein the priority of an audio channel is determined based on a machine learning classification of the audio channel.

16. A system in accordance with claim 13, wherein the priority of an audio channel is determined based on a priority schedule with respect to a timeline of the input audio.

17. A method for dynamically mixing audio content, the method comprising the steps of:
   receiving input audio;
   analyzing, with one or more processors of a computerized device, the input audio to determine one or more masking patterns, wherein the input audio comprises a plurality of audio channels and individual masking patterns quantify an extent to which an audio channel of the plurality of audio channels causes psychoacoustic masking with respect to one or more other audio channels of the plurality of audio channels;
   attenuating one or more lower priority audio channels of the input audio in accordance with the one or more masking patterns such that, after attenuation, individual masking patterns corresponding to individual lower priority audio channels indicate reduced psychoacoustic masking with respect to one or more higher priority audio channels; and, outputting the attenuated audio comprising the one or more attenuated channels.

18. A method according to claim 17, wherein the input audio comprises at least a first audio channel and a second audio channel;
   the step of analyzing the input audio comprises determining one or more masking patterns of the first audio channel with respect to the second audio channel, and
   the step of attenuating the one or more lower priority audio channels of the input audio comprises attenuating at least part of the second channel based on the one or more masking patterns of the first channel.

19. A method according to claim 18, further comprising the steps of:
   receiving video game data from a video game system; and
   determining priority levels of audio channels according to the received video game data, and wherein the step of attenuating one or more audio channels of the input audio comprises attenuating a lowest priority channel based on one or more masking patterns of a highest priority channel.

20. A non-transitory, computer readable storage medium containing a computer program comprising computer executable instructions that when executed by a computer system, cause the computer system to perform a method for dynamically mixing audio content, the method comprising the steps of:
   receiving input audio;
   analyzing the input audio to determine one or more masking patterns, wherein the input audio comprises a plurality of audio channels and individual masking patterns quantify an extent to which an audio channel of the plurality of audio channels causes psychoacoustic masking with respect to one or more other audio channels of the plurality of audio channels;
   attenuating one or more lower priority audio channels of the input audio in accordance with the one or more masking patterns such that, after attenuation, individual masking patterns corresponding to individual lower priority audio channels indicate reduced psychoacoustic masking with respect to one or more higher priority audio channels; and,
   outputting the attenuated audio comprising the one or more attenuated channels.

* * * * *